(12) United States Patent
Boley et al.

(10) Patent No.: US 11,709,144 B2
(45) Date of Patent: Jul. 25, 2023

(54) STEAM TRAP MONITORING DEVICES, SYSTEMS, AND RELATED TECHNIQUES

(71) Applicant: Everactive, Inc., Santa Clara, CA (US)

(72) Inventors: Jim Boley, San Francisco, CA (US); Kyle Craig, Charlottesville, VA (US); Shadi Hawawini, Mountain View, CA (US); Nathan E. Roberts, Charlottesville, VA (US); David D. Wentzloff, Ann Arbor, MI (US); Benton H. Calhoun, Charlottesville, VA (US)

(73) Assignee: Everactive, Inc., Santa Clara, CA (US)

( * ) Notice: Subject to any disclaimer, the term of this patent is extended or adjusted under 35 U.S.C. 154(b) by 0 days.

(21) Appl. No.: 17/643,729

(22) Filed: Dec. 10, 2021

(65) Prior Publication Data

US 2022/0099608 A1   Mar. 31, 2022

Related U.S. Application Data

(63) Continuation of application No. 16/534,945, filed on Aug. 7, 2019, now Pat. No. 11,226,302.

(51) Int. Cl.
| | | |
|---|---|---|
| *G01N 25/72* | (2006.01) | |
| *G05D 23/12* | (2006.01) | |
| *F22B 37/38* | (2006.01) | |
| *F16T 1/48* | (2006.01) | |

(52) U.S. Cl.
CPC ............ *G01N 25/72* (2013.01); *F16T 1/48* (2013.01); *F22B 37/38* (2013.01); *G05D 23/123* (2013.01)

(58) Field of Classification Search
USPC ........................................................ 702/130
See application file for complete search history.

(56) References Cited

U.S. PATENT DOCUMENTS

| | | | |
|---|---|---|---|
| 8,935,126 | B2 | 1/2015 | Armstrong et al. |
| 9,020,456 | B2 | 4/2015 | Wentzloff et al. |
| 9,413,403 | B2 | 8/2016 | Wentzloff et al. |
| 11,226,302 | B2 | 1/2022 | Wentzloff et al. |
| 2006/0122808 | A1 | 6/2006 | Quake et al. |
| 2007/0073495 | A1 | 3/2007 | Anderson et al. |

(Continued)

FOREIGN PATENT DOCUMENTS

| | | |
|---|---|---|
| CN | 104930340 | 9/2015 |
| GB | 2457924 | 9/2009 |

(Continued)

OTHER PUBLICATIONS

"Energy Harvesting Applications" Emerson Global Users Exchange, Presentation, Oct. 2, 2017, 26 pages.
U.S. Office Action dated Jun. 16, 2021 issued in U.S. Appl. No. 16/534,945.

(Continued)

*Primary Examiner* — Paul D Lee
(74) *Attorney, Agent, or Firm* — Weaver Austin Villeneuve & Sampson LLP

(57) ABSTRACT

Devices, systems, and techniques relating to steam trap monitoring are described. These include battery-less steam trap monitors that run on power harvested from their environments, systems for acquiring steam trap monitor data for the traps in a facility or across multiple facilities, and techniques for processing steam trap monitor data to reliably determine the status of individual steam traps and potentially other system parameters.

20 Claims, 6 Drawing Sheets

(56) References Cited

U.S. PATENT DOCUMENTS

| | | | |
|---|---|---|---|
| 2008/0054638 A1* | 3/2008 | Greene | H02J 50/001 |
| | | | 290/1 R |
| 2008/0150737 A1* | 6/2008 | Karschnia | F22B 37/428 |
| | | | 340/605 |
| 2010/0153068 A1 | 6/2010 | Armstrong et al. | |
| 2010/0305883 A1 | 12/2010 | Danzy | |
| 2011/0100488 A1 | 5/2011 | Somrah | |
| 2012/0031985 A1 | 2/2012 | Do et al. | |
| 2012/0204650 A1 | 8/2012 | Kleven | |
| 2013/0174649 A1 | 7/2013 | Hains et al. | |
| 2014/0269563 A1 | 9/2014 | Wentzloff et al. | |
| 2015/0013622 A1 | 1/2015 | Farris et al. | |
| 2016/0037486 A1 | 2/2016 | Wentzloff et al. | |
| 2017/0078111 A1 | 3/2017 | Bryce et al. | |
| 2017/0088271 A1 | 3/2017 | Barladian et al. | |
| 2017/0241414 A1 | 8/2017 | Billing et al. | |
| 2018/0176914 A1 | 6/2018 | Hagihara | |
| 2018/0217110 A1 | 8/2018 | Owens et al. | |
| 2019/0294186 A1 | 9/2019 | Ploegert et al. | |
| 2021/0041383 A1 | 2/2021 | Wentzloff et al. | |
| 2021/0116322 A1 | 4/2021 | Klanderud et al. | |
| 2022/0099609 A1 | 3/2022 | Boley et al. | |

FOREIGN PATENT DOCUMENTS

| | | |
|---|---|---|
| GB | 2457924 B | 4/2012 |
| JP | 3987707 | 10/2007 |

OTHER PUBLICATIONS

U.S. Notice of Allowance dated Oct. 6, 2021 issued in U.S. Appl. No. 16/534,945.
PCT International Search Report and Written Opinion, dated Sep. 17, 2020, issued in Application No. PCT/US2020/070357.
PCT International Search Report and Written Opinion, dated Jan. 28, 2021, issued in Application No. PCT/US2020/055401.
International Preliminary Report on Patentability dated Feb. 17, 2022 in PCT Application No. PCT/US2020/070357.
PCT International Preliminary Report on Patentability dated Apr. 28, 2022 issued in PCT/US2020/055401.
U.S. Non-Final office Action dated Sep. 29, 2022 in U.S. Appl. No. 17/643,731.
U.S. Final Office Action dated Oct. 20, 2022, in U.S. Appl. No. 16/654,949.
U.S. Non-Final Office Action dated May 11, 2022, in U.S. Appl. No. 16/654,949.

* cited by examiner

STEAM TRAP MONITORING DEVICES, SYSTEMS, AND RELATED TECHNIQUES

INCORPORATION BY REFERENCE

An Application Data Sheet is filed concurrently with this specification as part of this application. Each application to which this application claims benefit or priority as identified in the concurrently filed Application Data Sheet is incorporated by reference herein in its entirety and for all purposes.

BACKGROUND

Steam systems provide energy via heat transfer in a wide variety of industrial applications. Steam generated by a boiler flows through a distribution system to heat exchangers by which the heat of the steam is transferred to loads. As heat is transferred, either to the loads to which the energy is directed or as losses from the distribution system, at least some of the steam condenses to liquid form (condensate). This condensate reduces the efficiency of the heat transfer of the system. Condensate can also result in catastrophic damage to the system if accelerated to high speeds by the remaining live steam. Non-condensable gases (e.g., oxygen and carbon dioxide) that enter or form in the system also reduce system efficiency and can contribute to corrosion of system components.

Steam traps are devices designed to discharge condensates and non-condensable gases from steam systems, preferably with minimal loss of steam. There are currently several basic types of steam traps including, for example, mechanical traps, temperature traps, thermodynamic traps, Venturi nozzle traps, etc. Each type has advantages and disadvantages that affect its desirability for a given application. And while steam traps are effective at maintaining the efficiency of steam systems, they are characterized by failure modes that can result in system inefficiency and down time and so must be regularly inspected and maintained. But manual inspection of steam traps can be expensive, or even impractical, particularly for facilities in which there might be hundreds or even thousands of steam traps.

To address this issue, electronic steam trap monitors have been developed that automatically monitor parameters of a steam trap with which they are associated and transmit fault signals when those parameters cross acceptable operational thresholds. However, most steam trap monitors on the market today have issues both with the reliability with which they detect fault conditions, and the fact that most are battery powered and therefore require periodic battery inspection and/or replacement, therefore at least partially defeating the purpose for which they were installed.

SUMMARY

According to various implementations, methods, apparatus, devices, systems, and computer program products are provided at least some of which relate to steam trap monitoring.

According to a particular class of implementations, methods, apparatus, devices, systems, and computer program products are provided in which steam trap data for a steam trap are received. The steam trap data include time series data representing one or both of steam temperature and condensate temperature. Normal baseline operation of the steam trap is determined based on a first range of the time series data. A change in operation of the steam trap is determined based on one or more data points of the time series data.

According to a specific implementation of this class, the time series data include first time series data representing the steam temperature and second time series data representing the condensate temperature. Determining the normal baseline operation of the steam trap includes: generating a plurality of vectors using the steam trap data, the plurality of vectors including one or more steam temperature envelope vectors based on the first time series data, and one or more condensate temperature envelope vectors based on the second time series data; determining one or more periods during which live steam is flowing at the steam trap based on the first time series data; and based on determining the one or more periods and the normal baseline operation of the steam trap, processing a first subset of the vectors to determine a state of the steam trap during at least one of the periods.

According to a more specific implementation, the state of the steam trap includes one of normal, failed open, modulating, or failed closed.

According to another more specific implementation, determining the one or more periods includes: using a plurality of methods to determine a plurality of on states and a plurality of off states based on the first time series data using each of the methods, each of the on states and each off states having a confidence value associated therewith; and using the confidence values, combining or selecting from among the on and off states for the plurality of methods to define the one or more periods.

According to another more specific implementation, determining the one or more periods includes determining a set of floating thresholds based on the one or more steam temperature envelope vectors, and determining points at which the first time series data are above or below corresponding floating thresholds.

According to another more specific implementation, determining the one or more periods includes determining points at which the first time series data are above or below a fixed threshold using a range of hysteresis around the fixed threshold.

According to another more specific implementation, determining the one or more periods includes determining a first point at which the first time series data is below a threshold, and identifying a second point in the first time series data earlier than the first point as corresponding to a steam off event. According to an even more specific implementation, the second point is identified using a sample time interval vector based on either or both of the first and second time series data.

According to another more specific implementation, determining the one or more periods includes determining a threshold based on a ground truth event representing a baseline for normal operation of the steam trap, and determining points at which the first time series data are above or below the threshold.

According to specific implementation of this class, determining the normal baseline operation of the steam trap is based, at least in part, on determining, based on the time series data, that the steam trap is in a modulated steam application.

According to a more specific implementation, determining that the steam trap is in a modulated steam application includes applying a fast Fourier transform to at least a portion of the time series data, or applying an autocorrelation function to at least a portion of the time series data.

According to a specific implementation of this class, the time series data include first time series data representing the steam temperature and second time series data representing the condensate temperature, and determining the normal baseline operation of the steam trap includes: generating a plurality of vectors using the steam trap data, the plurality of vectors including one or more steam temperature envelope vectors based on the first time series data, and one or more condensate temperature envelope vectors based on the second time series data; and determining a centroid of a set of data points using the one or more steam temperature envelope vectors or the one or more condensate temperature envelope vectors, each data point representing corresponding values of the first or second time series data. Determining a change in operation of the steam trap includes: tracking deviations of the data points relative to the centroid of the data points; and identifying a subset of the deviations having corresponding magnitudes larger than a threshold and corresponding angles within a specified angle range.

According to a more specific implementation, the threshold is based on a variance of the data points. According to an even more specific implementation, the threshold is defined based on a specific number of standard deviations of the variance.

According to another more specific implementation, steam trap metadata are received. The steam trap metadata represent a steam trap type of the steam trap and a steam trap application of the steam trap. The threshold and specified angle range are based on the steam trap type and the steam trap application.

According to a specific implementation of this class, steam trap metadata are received. The steam trap metadata represent a steam trap type of the steam trap and a steam trap application of the steam trap. Determining the normal baseline operation of the steam trap is based on the steam trap type and the steam trap application.

According to another class of implementations, a sensing device includes one or more sensors configured to generate sensor signals, one or more transmitters configured to transmit sensor data representing the sensor signals, and control circuitry configured to control operation of the one or more transmitters, and to convert the sensor signals to the sensor data. A first energy harvesting device is configured to harvest a first type of energy from an environment in which the sensing device is deployed. A second energy harvesting device is configured to harvest a second type of energy from the environment, the second type of energy being different from the first type of energy. An energy storage device is configured to store energy derived from the first and second types of energy. Power management circuitry is configured to receive first power from the first energy harvesting device and second power from the second energy harvesting device, and control storing of the stored energy by the energy storage device. The power management circuitry is further configured to provide third power generated from the stored energy to the one or more transmitters and the control circuitry. The power management circuitry is also configured to operate in a first mode in which the stored energy is derived only from the first power, in a second mode in which the stored energy is derived only from the second power, and in a third mode in which the stored energy is derived from a combination of the first power and the second power.

According to a specific implementation of this class, each of the first and second types of energy is one of light energy, mechanical energy, heat energy, vibrational energy, acoustic energy, ultrasonic energy, radio frequency energy, electromagnetic energy, or magnetic energy.

According to a specific implementation of this class, the power management circuitry includes at least one of a DC-DC converter, an AC-DC converter, a buck converter, a boost converter, a buck-boost converter, or a single inductor multiple output (SIMO) converter.

According to a specific implementation of this class, the energy storage device is one of a capacitor, or a battery.

According to a specific implementation of this class, the sensing device is configured to monitor a steam trap. The one or more sensors include a first temperature sensor and a second temperature sensor, and the sensor data represent steam temperature and condensate temperature.

According to a more specific implementation, the sensor data include first time series data representing the steam temperature and second time series data representing the condensate temperature.

According to another more specific implementation, the first energy harvesting device comprises a thermo-electric generator and the second energy harvesting device comprises one or more photovoltaic cells.

According to a specific implementation of this class, selection circuitry is configured to selectively enable the power management circuitry to operate in the first, second, or third modes.

According to a specific implementation of this class, the power management circuitry includes power-point-tracking circuitry configured to track either or both of the first power generated by the first energy harvesting device and the second power generated by the second energy harvesting device.

According to another class of implementations, a sensing device includes one or more temperature sensors configured to generate sensor signals representing one or more temperatures, one or more transmitters configured to wirelessly transmit sensor data representing the sensor signals to a remote device, and control circuitry configured to control operation of the one or more transmitters, and to convert the sensor signals to the sensor data. The sensor data include time series data representing the one or more temperatures. A thermo-electric generator is configured to harvest heat energy from an environment in which the sensing device is deployed. An energy storage device is configured to store energy derived from the heat energy.

According to a specific implementation of this class, a second energy harvesting device is configured to harvest a second type of energy from the environment, the second type of energy being different from heat energy. Power management circuitry is configured to receive first power from the thermo-electric generator and second power from the second energy harvesting device, and control storing of the stored energy by the energy storage device. The power management circuitry is further configured to provide third power generated from the stored energy to the one or more transmitters and the control circuitry.

According to a more specific implementation, the power management circuitry is further configured to operate in a first mode in which the stored energy is derived only from the first power, in a second mode in which the stored energy is derived only from the second power, and in a third mode in which the stored energy is derived from a combination of the first power and the second power. According to an even more specific implementation, selection circuitry is configured to selectively enable the power management circuitry to operate in the first, second, or third modes.

According to another more specific implementation, the power management circuitry includes power-point-tracking circuitry configured to track either or both of the first power generated by the thermo-electric generator and the second power generated by the second energy harvesting device.

According to another more specific implementation, the second type of energy is one of light energy, mechanical energy, vibrational energy, acoustic energy, ultrasonic energy, radio frequency energy, electromagnetic energy, or magnetic energy.

According to another more specific implementation, the power management circuitry includes at least one of a DC-DC converter, an AC-DC converter, a buck converter, a boost converter, a buck-boost converter, or a single inductor multiple output (SIMO) converter.

According to another more specific implementation, the second energy harvesting device comprises one or more photovoltaic cells.

According to a specific implementation of this class, the energy storage device is one of a capacitor, or a battery.

According to a specific implementation of this class, the sensing device is configured to monitor a steam trap, wherein the one or more temperature sensors include a first temperature sensor and a second temperature sensor, and wherein the sensor data represent steam temperature and condensate temperature.

According to a specific implementation of this class, the sensor data include first time series data representing the steam temperature and second time series data representing the condensate temperature.

A further understanding of the nature and advantages of various implementations may be realized by reference to the remaining portions of the specification and the drawings.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

The present disclosure describes various devices, systems, and techniques relating to steam trap monitoring, including battery-less steam trap monitors that run on power harvested from their environments, systems for acquiring steam trap monitor data for the traps in a facility or across multiple facilities, and techniques for processing steam trap monitor data to reliably determine the status of individual steam traps and potentially other system parameters. It should be noted that the described examples may be used in various combinations. It should also be noted that at least some of the examples described herein may be implemented independently of the others. For example, the techniques described herein for processing steam trap monitor data may be employed to process data captured using any of a wide variety of monitors including, but not limited to, the monitors described herein. Similarly, the steam trap monitors described herein may be used with any of a wide variety of monitoring systems and data processing techniques including, but not limited to, the systems and techniques described herein.

Figure 1:
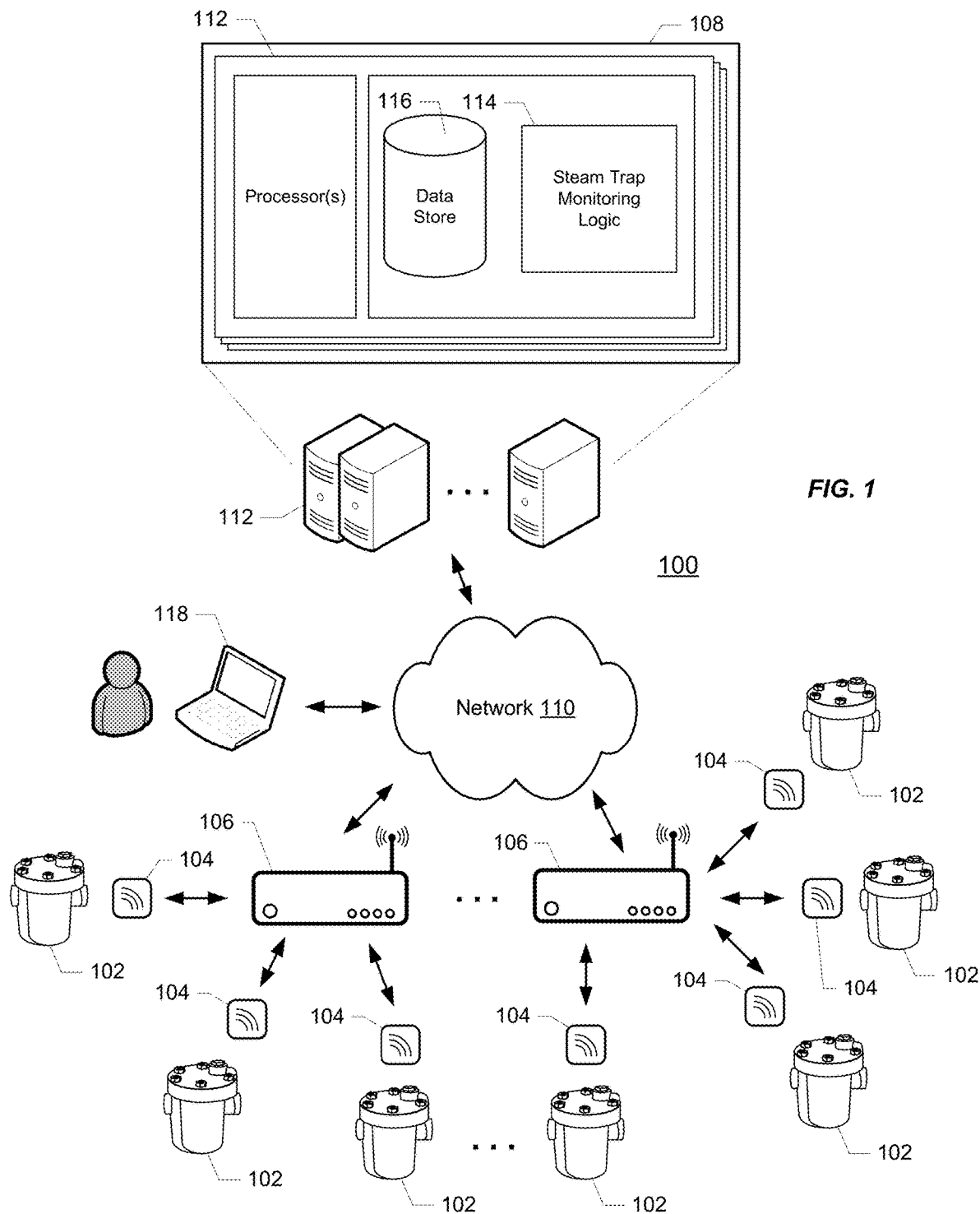
FIG. 1 depicts an example of a steam system and a cloud-connected steam trap monitoring system enabled by the present disclosure.

FIG. 1 depicts a steam trap monitoring system 100 in which multiple steam traps 102 (potentially hundreds or even thousands) are deployed throughout a facility that employs a steam system. The details of the steam system are not shown for reasons of clarity. In addition, the steam traps in FIG. 1 are depicted as conventional inverted-bucket-type steam traps. However, it should be noted that this is merely one example of the types of steam traps that may be monitored as described herein. That is, the systems, monitors, and techniques described herein may be used with any of the four basic types of steam traps, e.g., mechanical traps, temperature traps, thermodynamic traps, and Venturi nozzle traps.

Each steam trap 102 has an associated steam trap monitor (STM) 104 mounted on or near the steam trap. STMs 104 generate various types of sensor data relating to the associated steam trap 102 and its adjacent piping. STMs 104 transmit the sensor data to control nodes 106 that, in turn, transmit the sensor data to an STM data service 108 via network 110. As will be appreciated, the number of STMs 104 and control nodes 106 will vary depending on the facility.

STM service 108 may conform to any of a wide variety of architectures such as, for example, a services platform deployed at one or more co-locations, each implemented with one or more servers 112. STM service 108 may also be partially or entirely implemented using cloud-based computing resources. Network 110 represents any subset or combination of a wide variety of network environments including, for example, TCP/UDP over IP-based networks, unicast/multicast/broadcast networks, telecommunications networks, wireless networks, satellite networks, cable networks, public networks, private networks, wide area networks, local area networks, the Internet, the World Wide Web, intranets, extranets, and so on.

At least some of the examples described herein contemplate implementations based on computing models that enable ubiquitous, convenient, on-demand network access to a pool of computing resources (e.g., cloud-based networks, servers, storage, applications, and services). As will be understood, such computing resources may be integrated with and/or under the control of the same entity controlling STM data service 108. Alternatively, such resources may be independent of service 108, e.g., on a platform under control of a separate provider of computing resources with which service 108 connects to consume computing resources as needed, e.g., a cloud-computing platform or service.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

STMs 104 may communicate with control nodes 106 using any of a wide variety of wired and wireless protocols and technologies. According to some implementations, control nodes 106 and STMs 104 communicate using a proprietary low-power communication protocol known as Evernet™ provided by Everactive, Inc., of Santa Clara, Calif. Examples of such protocols and associated circuitry suitable for use with such implementations are described in U.S. Pat. Nos. 9,020,456 and 9,413,403, and U.S. Patent Publications No. 2014/0269563 and No. 2016/0037486, the entire disclosure of each of which is incorporated herein by reference for all purposes. However, it should be noted that implementations are contemplated in which other modes of communication between the STMs and the rest of the system are employed.

Control nodes 106 may be implemented using any of a variety of suitable industrial Internet gateways, and may connect to STM service 108 using any of a variety of wired and wireless protocols, e.g., various versions of Ethernet, various cellular (e.g., 3G, LTE, 5G, etc.), various wi-fi (802.11b/g/n, etc.), etc. In some cases, otherwise conventional gateways are augmented to include components that implement the Evernet™ protocol.

Each STM 104 generates sensor data representing one or more temperatures associated with the steam trap with which it is associated, and possibly other sensed data associated with the trap. The one or more temperatures include steam temperature and/or condensate temperature. Steam temperature is captured using a temperature sensor (e.g., a thermistor) connected to the piping of the system side of the trap (which might be live steam or a load). Condensate temperature is captured using a temperature sensor (e.g., a thermistor) connected to the piping through which condensate and non-condensable gases are expelled. The STMs may also be configured to capture and generate sensor data representing ambient temperature and/or humidity of the environment in which the STM is deployed.

Each STM 104 may also be configured to generate sensor data representing a variety of other parameters generated by a variety of sensor types and/or sources. For example, an STM might monitor light levels, humidity, vibrational or other types of mechanical energy, acoustic energy, ultrasonic energy, etc.

According to a particular implementation, in response to a wakeup message from its control node 106 or a local wakeup timer, each STM 104 transitions from a low-power mode, takes readings on each of its sensors, and transmits digitized versions of the readings to its control node 106 in a packet in which each sensor and its reading are paired (e.g., as a label-value pair). The packet also includes information (e.g., in a header) that identifies the specific STM with a unique identifier and the timestamp of the readings in the packet. The wakeup messages may be periodically transmitted from each control node to its associated STMs.

Each control node 106 stores the packets received from its STMs 104 in its local database, and periodically or opportunistically uploads the stored information to STM data service 108 (e.g., to a cloud-based service when the control node is connected to the Internet). Thus, if there is an outage, the control node is able to cache the sensor data until the connection is restored. The processing of the sensor data is done by STM data service 108, e.g., using logic 114. STM data service 108 also stores historical data for steam trap monitoring system 100 (e.g., in data store 116). Steam trap data and other system data generated by STM data service 108 and stored in data store 116 may be accessed on demand (e.g., in a dashboard on computing device 118) by responsible personnel associated with the facility or facilities in which the steam trap monitoring system is deployed.

Steam temperature and condensate temperature are useful for determining the state of a steam trap because a steam trap is designed to collect condensate that forms in the steam system at or near where the trap is deployed. A steam trap is usually installed at low points in the steam distribution system. Every so often, the steam trap expels collected condensate into a drain line. When a steam trap fails, it often fails to a condition which results in steam going straight through the trap into the drain line.

In a simple example, the steam side of a steam trap is typically expected to be at or near the temperature of live steam (e.g., well over 100 degrees C.). By contrast, because of the presence of condensate, the condensate side of the trap is typically expected to be at a lower temperature than the steam side of the trap. If a steam trap fails open, this may be detected based on a higher than expected temperature at the condensate side of the trap relative to the steam temperature. However, because of the different types of steam traps, the different applications in which they are installed, the diversity of failure modes, and the inherent noisiness of the temperature data, determining the state of the trap using a simple comparison of the two temperatures may not be particularly reliable.

As will be discussed below, the present disclosure enables a variety of techniques by which these and potentially other parameters may be processed to determine more reliably the state of an individual steam trap. In addition, a variety of system parameters beyond the state of the individual steam trap may be detected or determined by monitoring these temperatures and/or other parameters. For example, a dip in steam temperature might be caused by a drop in pressure at the boiler or a pressure reducing valve (PRV). Such a determination might be made based on a set of data points from one STM and/or data sets from multiple STMs distributed around the system. Data from multiple STMs may also be used to make finer-grained assessments such as, for example, distinguishing between a pressure problem with the boiler or the pressure reducing valve (PRV).

More generally, implementations are contemplated in which various subsets of STM data (both captured data and derived data) may be used to define a normal baseline operation (and potentially some range around normal) for any of a wide variety of system behaviors or components. Such definitions of normal may then be used to detect deviations from the expected range. This might initially involve the identification of a general fault condition, but also could be refined over time to identify specific states and/or failure modes as represented by corresponding data signatures. Such signatures might be represented using data generated by one or multiple STMs, at a given point in time, or over a particular time range.

Figure 2:
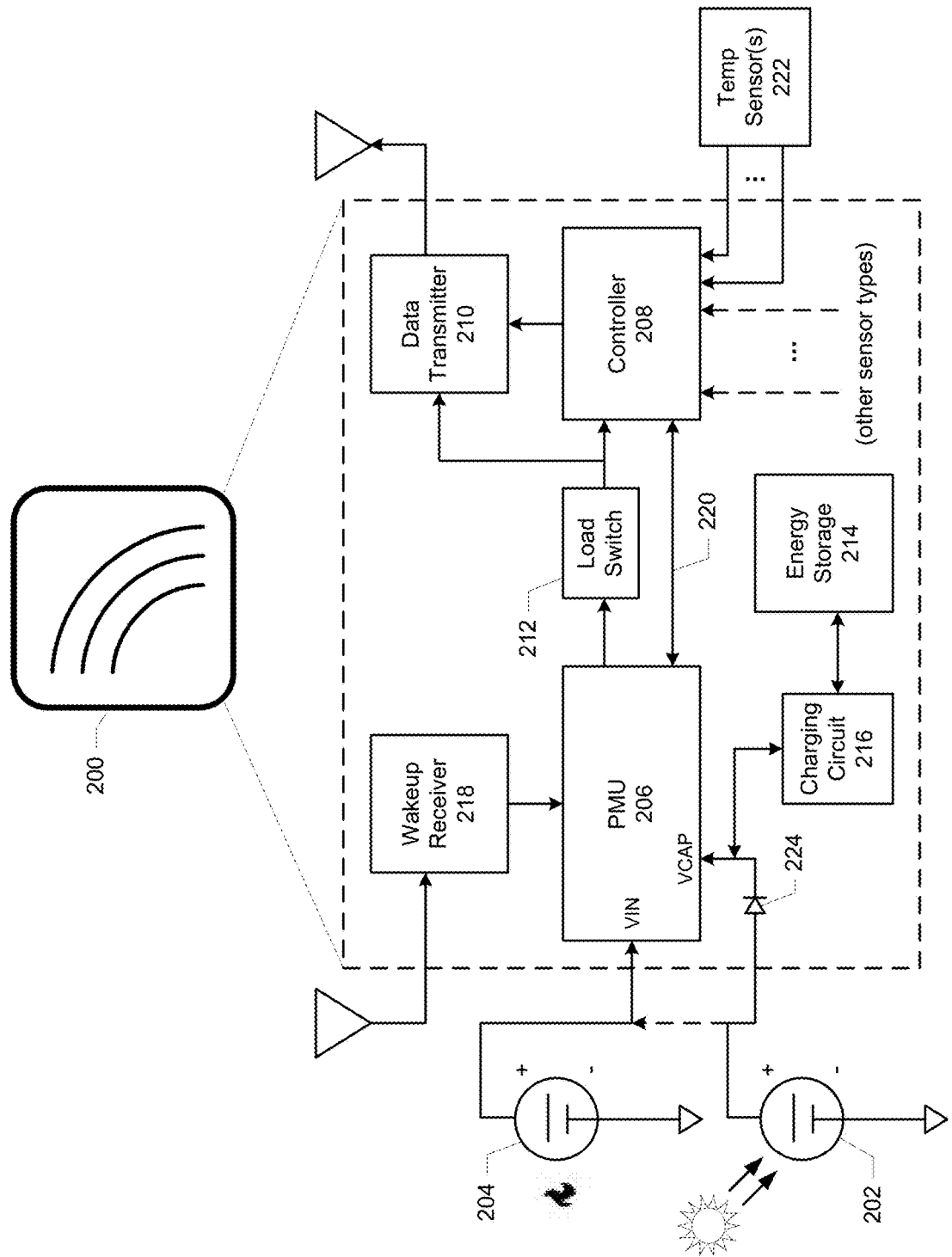
FIG. 2 is a block diagram of steam trap monitor enabled by the present disclosure.

According to some implementations, STMs are employed that operate using power harvested from the environments in which they are deployed. FIG. 2 is a block diagram of an example of such an STM 200. In the depicted implementation, STM 200 is powered using energy harvested from its environment with a photovoltaic (PV) device 202 that captures energy from the ambient light in the vicinity of STM 200, and a thermoelectric generator (TEG) 204 that captures thermal energy from, for example, the pipes of the steam distribution system. As will be discussed, implementations are contemplated in which the STM's power management unit may be configured such that the STM can use power from the PV device in a "solar only" mode (as indicated by the dashed line from PV device 202 to VIN), the TEG in a "TEG only" mode, or a combination of both in a "solar assist" mode (as indicated by the solid line from PV device 202 to VCAP). Suitable switching circuitry for configuring these connections will be known to those of skill in the art and so is not depicted for clarity.

STM 200 includes a power management unit (PMU) 206 that controls the delivery of power to controller 208 and data transmitter 210 via load switch 212. VIN is the harvesting input to PMU 206, and VCAP, and three voltage rails (not shown for clarity) are the generated outputs. PMU 206 charges energy storage device 214 (e.g., a super-capacitor) with VCAP via charging circuit 216 using energy harvested from either or both of PV device 202 and TEG 204 (depending on the harvesting mode). Load switch 212 and charging circuit 216 control when power is provided to the rest of STM 200 and allow STM 200 to be functional while energy storage device 214 is charging.

STM 200 receives a wakeup message (e.g., with wakeup receiver 218) from a system control node with which it is associated. Receipt of the wakeup message triggers control of load switch 212 by PMU 206 to provide power to controller 208 for capturing readings associated with the steam trap being monitored by STM 200, and to transmitter 210 for transmitting sensor data to the control node. PMU 206 also communicates with controller 208 via digital I/O channel 220. This can be used by the controller to monitor the status of the PMU 206, and to update its configuration or calibration settings.

Once awakened and powered up, controller 208 captures readings using one or more sets of sensors associated with STM 200. As depicted, these might include one or more temperature sensors 222 (e.g., thermistors connected to the piping adjacent the trap). Sensors to detect or measure other parameters or types of readings (e.g., ambient temperature and/or light, acoustic, ultrasonic, humidity, vibrational/mechanical energy, etc.) are also contemplated. As discussed above, controller 208 packetizes the digitized sensor data and transmits the packet(s) to the associated sensor node via data transmitter 210.

According to a particular implementation, PMU 206 includes a boost DC-DC converter that employs maximum power point tracking to boost the relatively low voltage VIN received from one of the harvesting sources (e.g., PV device 202 or TEG 204 depending on the mode) to a higher voltage VCAP at its output that is used to charge the energy storage device (e.g., 214). Once VCAP is sufficiently high, a buck/boost, a single-input-multiple-output (SIMO) DC-DC converter turns on and takes VCAP and brings it up or down (depending on the level of charge of energy storage device 214), generating three voltage rails; +2.5, +1.2, and +0.6 volts respectively. These voltage rails are for use in powering the other electronics of STM 200 (e.g., controller 208 and transmitter 210).

In the "solar assist" harvesting mode, PV device 202 may be attached directly to VCAP through diode 224 (to prevent leakage) as represented by the solid line connection in FIG. 2. In this mode, and assuming its output is sufficient to forward bias diode 224, PV device 202 may provide a charging assist to TEG 204 with the energy of the two harvesting sources naturally combining in energy storage device 214 without requiring complicated control electronics. According to a particular implementation, in the "solar assist" mode, PV device 202 is used to raise VCAP such that the biasing to the boost converter turns on. This allows the boost to harvest from lower input voltages (e.g., allowing harvesting from lower temperature deltas on TEG 204). In another implementation, PV device 202 may connect to VIN of PMU 206 as shown by the dashed line in FIG. 2. This allows for lower levels of light, or lower voltage PV cells to be boosted to recharge the energy storage element.

More generally, implementations are enabled by the present disclosure in which energy may be harvested from multiple different energy sources and used in any combination to power such an STM. Other potential sources for harvesting include vibration energy (e.g., using a piezoelectric-based device) and RF energy. As will be appreciated, these are AC energy sources and so would require AC-DC converters. And if the resulting DC voltages from any of these are not sufficiently high, they could be boosted using a boost converter.

Figure 3:
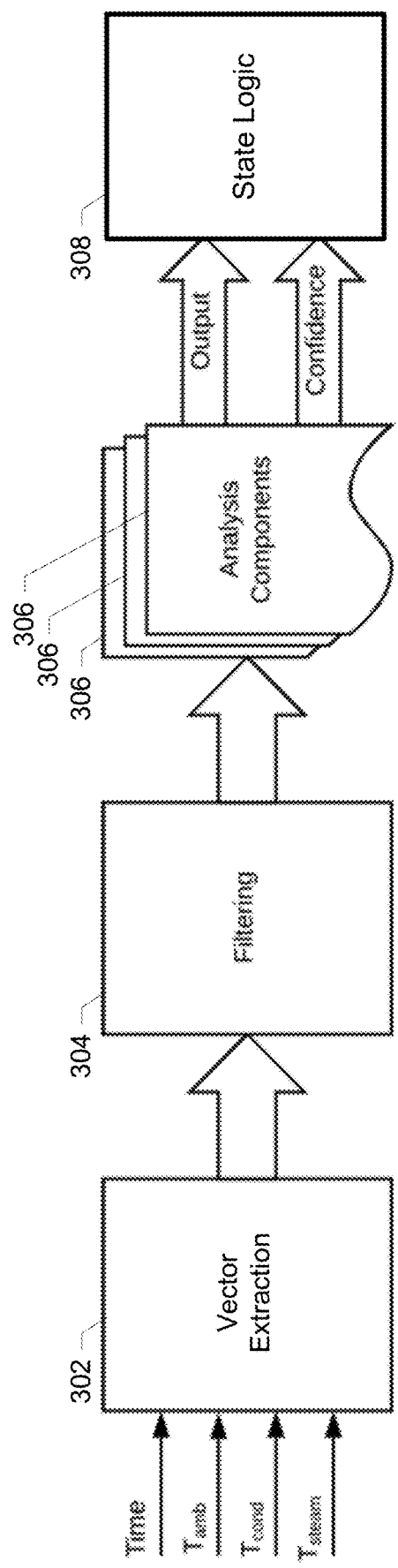
FIG. 3 is a flow diagram illustrating processing of steam trap monitor data as enabled by the present disclosure.

The processing of STM sensor data by an STM algorithm and its component analysis algorithms according to a particular class of implementations will now be described with reference to FIGS. 3-6. As mentioned above, these processing techniques may be used in conjunction with STMs enabled by the present disclosure, but also may be used with any of a wide variety of STM types. As illustrated in FIG. 3, the inputs to the STM algorithm include time series data, e.g., vectors, for the STM representing steam temperature ($T_{steam}$), condensate temperature ($T_{cond}$), (optionally) ambient temperate ($T_{amb}$), and time stamps for the corresponding values of the time series data (Time). Vector extraction (302) generates vector features from these input vectors for a number of different vector types.

According to some implementations, each vector may include feature values for the STM over its entire history, and each time the STM algorithm and its various analysis components runs, this entire history of the STM may be processed. This approach may be useful in that, to determine the state of the steam trap at any given point in time, its behavior over its lifetime may be relevant and so can be taken into account. That is, the historical behavior of the STM is often useful in understanding and/or informing its current behavior.

It should be noted, however, that implementations are contemplated in which only a subset of an STM's sensor data for a given time range might be processed. For example, if an STM has generated 10 years of sensor data, and there are time constraints on how quickly the state of the STM must be determined, an STM algorithm might be constrained to using sensor data from only the most recent year to speed up the processing time. In addition, repair or calibration of an STM might be introduced into its data set as a "ground truth" event that can serve to inform subsequent event detections and confidence scores and/or define the range of sensor data to be used.

According to some implementations, the vectors generated as a result of vector extraction 302 include a dt vector the values of which represent the time difference between consecutive samples in the time series data (e.g., as derived from the Time input vector). As will be discussed, this information is useful in determining the rate of change of any of the time series data and may be used, for example, in determining the timing of steam on and steam off events. As will also be discussed, the dt vector may also be used in detecting steam modulation, and detecting events representing significant changes in status of the steam trap.

Vector extraction 302 also results in generation of vectors referred to herein as Ts Envelope (max and min) and Tc Envelope (max and min) that represent temperature envelopes for the steam temperature and the condensate temperature, respectively. Each envelope is represented by two vectors including temperature values that are time-aligned to the original temperature values of the corresponding temperature vector, e.g., the values of the Ts Envelope (max and min) vectors are time-aligned to the values of the Ts vector. One of the envelope's vectors represents the maximum values of the corresponding temperature, while the other represents the minimum values. These representations adapt slowly to changes in the underlying temperate and are useful for detecting when these temperatures change in unexpected ways.

Vector extraction 302 may also result in generation of vectors for both steam temperature and condensate temperature referred to herein as Delta-T (steam and cond). The values of these Delta-T vectors represent the difference between consecutive temperature samples. This information may be useful, for example, in distinguishing between different trap states and/or failure modes.

Vector extraction 302 might also result in generation of vectors referred to herein as Ts Variance Energy and Tc Variance Energy. These are generated by feeding Ts and Tc, respectively, through a DC blocking filter to generate a measure of the energy in each of the signals. These vectors are representations of the stability of the corresponding temperatures (i.e., the steam and condensate temperatures) when they are stable, and can be thought of as a kind of noise floor. Implementations are contemplated in which either the raw magnitude or the log of the raw magnitude of the temperature values are used. Again, this information may be useful in distinguishing between different trap states and/or failure modes.

Vector extraction 302 might also result in generation of a vector referred to herein as Steam Off Decay Rate which represents the rate at which a trap cools off when steam is shut off in the system, e.g., the decay constant from the edge following a "steam off" event. The vector can be derived by low-pass filtering the Ts or Tc temperature data, with abnormal states or conditions being detected by observing the standard deviation and looking for outliers.

At least some of these vectors are passed through multiple filters (304) to provide different perspectives on the behavior of the vector. Most vectors receive some degree of low-pass filtering (short- or long-term averaging). The filtered vectors (from which digital signatures may be derived) are then analyzed using one or more analysis components (306) to generate various outputs, each of which has an associated confidence value. Some examples of such analyses components are discussed below.

The outputs from the analysis components may then be processed by another layer of logic to identify a possible state of the steam trap and/or the steam system (308). The identified state of a trap might be specific (e.g., normal, failed open, failed closed, etc.). Alternatively, the identified state might just be that something is not normal and a flag could be set that a specific steam trap should be manually checked.

Figure 4:
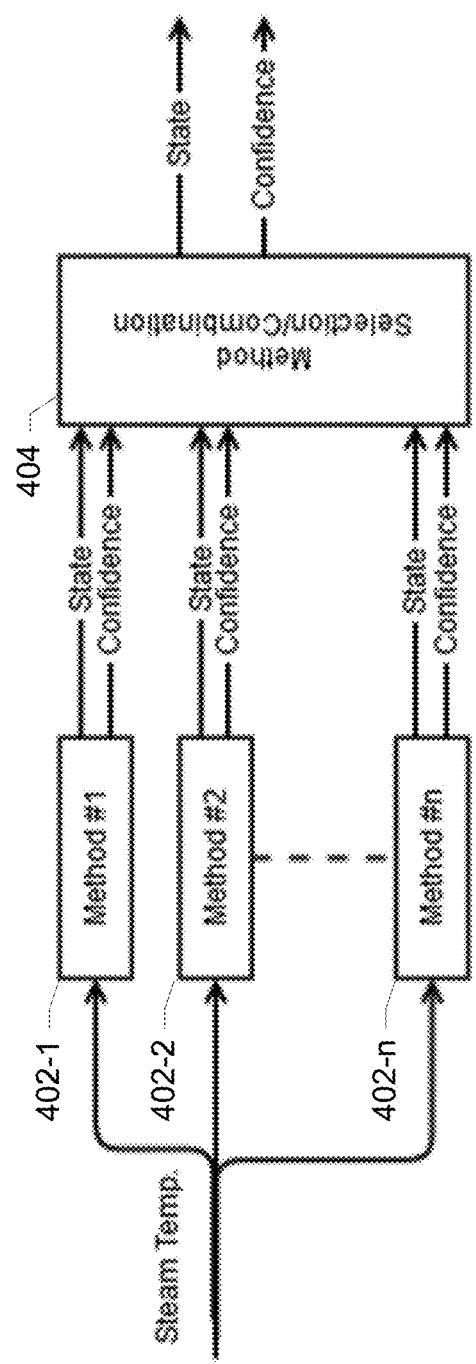
FIG. 4 is another flow diagram illustrating processing of steam trap monitor data as enabled by the present disclosure.
Figure 5:
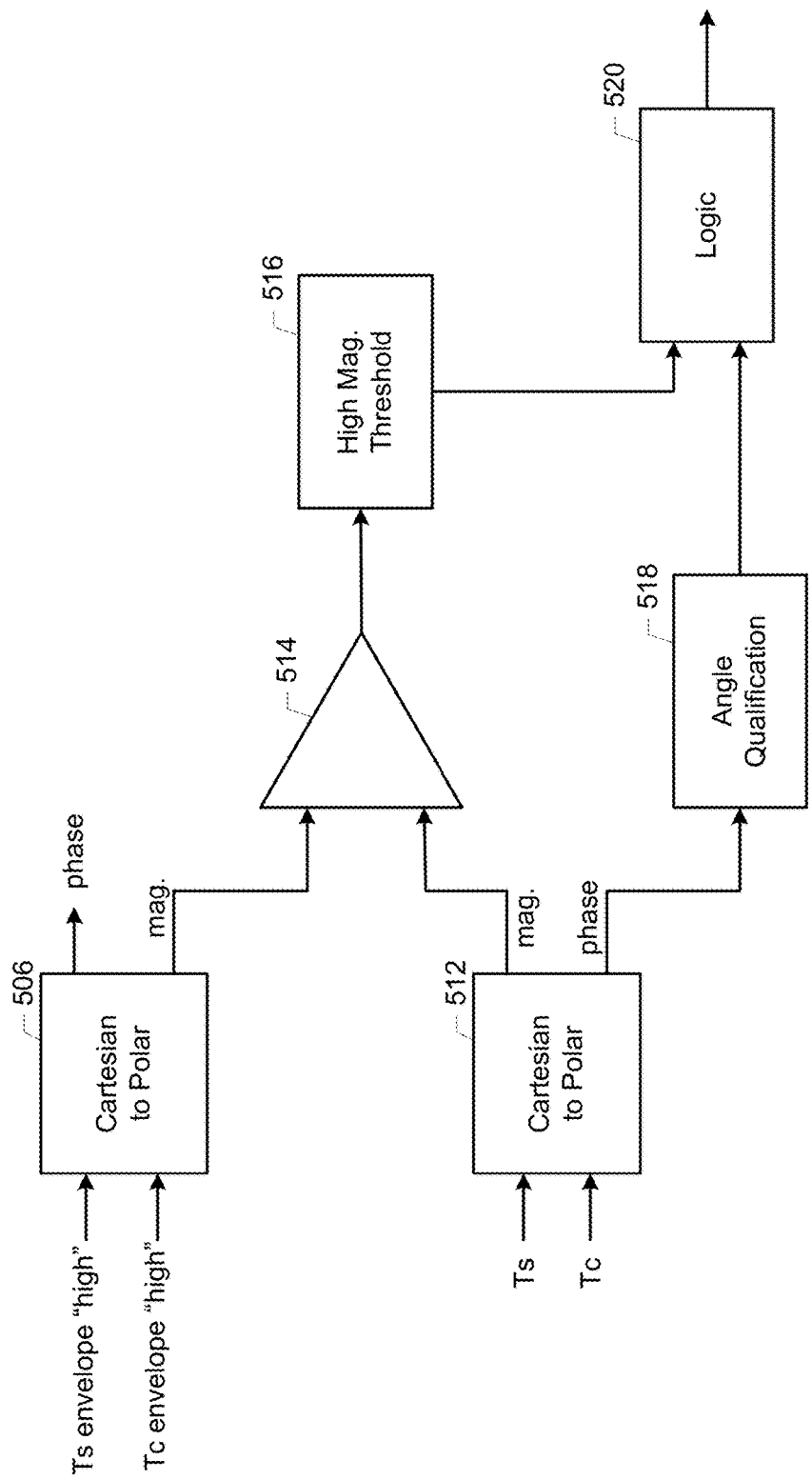
FIG. 5 is another flow diagram illustrating processing of steam trap monitor data as enabled by the present disclosure.

According to some implementations, one of the analysis components 306 uses steam temperature data to determine whether live steam is flowing at the steam trap. This steam on/off detection analysis is based on the assumption that determination of the state of the steam trap can be accomplished with a higher degree of reliability if it is known whether or not the steam is on at the trap. Whether or not steam is flowing to the trap (also referred to as the "system state") is determined by processing the steam temperature data using multiple determination methods as illustrated in the diagram of FIG. 4. Each method (402-1 through 402-$n$) generates a state output estimate vector along with a confidence vector. The outputs from the different determination methods are then selected and/or combined (404) to derive an overall system state estimate vector and an associated confidence vector. According to a particular implementation, the result of the method with the highest confidence is used to determine the overall system state. Alternatively, implementations are contemplated in which some combination of the outputs and confidence levels of the different methods is used.

One method suitable for use in steam on/off detection establishes fixed thresholds for the conditions "steam on" and "steam off" and uses hysteresis between the thresholds. The "steam on" threshold might be about 90 degrees C., while the "steam off" threshold might be about 60 degrees C. However, it should be understood that different thresholds might be used to better reflect the type of steam trap and the application in which it is installed. It should also be understood that the hysteresis thresholds do not necessarily need to the same as the on and off thresholds. For example, the hysteresis threshold down to which a steam on event might be maintained could be 70 degrees C., while the hysteresis threshold up to which an steam off event might be maintained could be 80 degrees C.

A confidence value may be calculated such that when the steam temperature is outside the thresholds, there is a reasonable level of confidence (e.g., >50%) that the system state is known. On the other hand, if the steam temperature is between the thresholds, knowledge of the system state is significantly less certain. Parameters that may be tuned for this method to suit a particular application or steam trap type include the "steam on" and "steam off" thresholds, and the confidence level at the thresholds.

Another method suitable for use in steam on/off detection adapts to the steam trap being monitored by generating "floating" thresholds. This is achieved by tracking the envelope of the steam temperature based on the observed extremes.

According to this method, steam is considered (1) "on" if the observed steam temperature exceeds the median value by some programmable value; (2) "off" if the observed temperature is below the median value by some programmable value; and (3) unchanged from the previous state if the temperature falls near the median (i.e., hysteresis).

In a first pass of a particular implementation, multi-segmented logic is applied to the observed steam temperature as it relates to the existing extremum. This logic operates as follows. If the observed temperature exceeds the current extremum, update the extremum through a low-pass filter. If the observed temperature is near an extremum (e.g., within a programmable value), and the observed temperature is stable (e.g., its derivative is below a programmable value), then update the extrema using a second low-pass filter. If the observed temperature is between the extremum and far from an extremum (e.g., outside of some programmable value), update the opposite extrema using a third low-pass filter. If none of these conditions are met, then the new extremum value matches their previous value.

The confidence vector generated by this method may take into account various parameters such as, for example, the temperature delta between the tracking extremum, the distance between the observed temperature and the tracked median, and/or the proximity of the tracking extremum to ambient temperature, among others. Further stability may also be provided through the use of an additional low pass filter on the median values.

Another method suitable for use in steam on/off detection involves the accumulation of ground truth events for particular steam traps (e.g., repair or recalibration) to inform the thresholds to which observed samples of time series data are compared. This approach involves the use of Boolean vectors representing each steam trap that include features representing, for example, the steam trap type and the specific application in which the steam trap is installed. The Boolean vectors are used to determine how closely the ground truth events for a particular steam trap should match those of another. For example, a temperature envelope for a given steam trap can be predicted based on analysis of the ground truth events for steam traps with which the given stream trap is closely correlated.

Because of the use of hysteresis, the point in time at which a "steam off" event is reported will likely be delayed relative to the point in time at which the event actually occurred. So in some cases it may be important that the determination of such events not rely solely on the crossing of a threshold. That is, it may be undesirable to evaluate the state of a steam trap when live steam is not present. And because the reporting of "steam off" event is likely delayed from the point in time at which the steam actually turned off, the data immediately preceding the report is considered unreliable for this purpose.

Therefore, according to a specific implementation, the time of the actual "steam off" event is determined. This is done by stepping back through the steam temperature data from the point in time at which the state change is reported to identify the point in time at which the steam temperature began to drop.

According to some implementations, states and confidence values for multiple STMs may be used to determine a system state, e.g., whether steam is on or off, with higher confidence. And these may be combined and/or weighted based on correlations among the traps, e.g., the steam trap types and the applications in which each is installed. The data for each STM might have associated metadata that represent various characteristics of the trap with which it is associated such as, for example, the steam trap type being monitored and the application in which the steam trap is installed, e.g., drip, coil, process, heat exchanger, etc. Such metadata may be taken into account in the processing of the outputs and confidence scores of the STM algorithm as well as any of its analysis components.

According to some implementations, one or more of the analysis components 306 of the STM algorithm of FIG. 3 uses the steam on/off state, steam and condensate temperature data, envelope tracking data, and trap and/or system metadata to determine one or more states of a particular steam trap. This analysis component identifies steam trap states based on corresponding changes in a distribution of the steam and condensate temperature data over time. A particular steam trap state (e.g., failed open) is identified based on the direction and magnitude of the change.

Assuming live steam is flowing at the steam trap (e.g., the "steam on" system state has been detected as described above) and as depicted in FIG. 5, the center of a "steam on" data cluster is determined by converting the steam and condensate temperature data and the temperature envelope tracking data Ts Envelope (max) and Tc Envelope (max) from Cartesian to polar coordinates (506 and 512).

Changes in the steam and condensate temperature data relative to a central point defined by the envelope tracking data and having a magnitude greater than a specified level (e.g., 1 to 3 standard deviations) (514 and 516), and a direction bounded by a specified range of angles (518) are flagged. Flagged events are reported with associated confidence scores (520).

The specified range of angles that define the direction of movement of the trap temperature data and/or the specified magnitude of the change may vary considerably depending on the trap type and the trap application, with different ranges of angles potentially representing different trap states or failure modes.

In many cases, steam traps are installed in applications in which the trap experiences considerable variation in the behavior of the live steam at the steam side of the trap under normal operating conditions. These normal operating conditions can look very different from the normal operating conditions for traps that experience more consistent live steam behavior. For example, for a trap that cycles on and off rapidly, the steam and/or condensate temperatures typically do not reach the same extremes as for a trap that is on or off for longer periods of time. This is to be expected, as the thermal mass of the system takes a long time to get to full temperature, effectively acting as a low-pass filter.

In another example, a trap might be installed on the opposite side of a load from the steam distribution system at a point at which condensate is expected to form during normal operation, e.g., a system with a heat exchanger having a trap below the exchanger. In such an application, the steam side of the trap would be expected to have a considerable amount of condensate under normal conditions, bringing the expected steam temperature down significantly as compared to a trap connected directly to the steam distribution system. For example, in such applications, the steam temperature for the "steam on" condition is lower than a trap on the steam supply. In addition, the temperature of the load might be regulated using a valve on top of the heat exchanger that cycles on and off to control the amount of steam going to the exchanger. This causes the trap temperatures to rise and fall according to a regular pattern with consistent frequency content.

These variations in the conditions experienced by steam traps in such applications are known collectively by the term "modulated steam." As will be appreciated, it may be important to determine whether a particular trap is experiencing modulated steam as part of determining the state of the trap.

Therefore, according to some implementations, one or more of the analysis components 306 of the STM algorithm of FIG. 3 uses the steam temperature data for a steam trap to detect whether that trap is deployed in a modulated steam application. Such analysis components are configured to detect regular or even semi-regular cycling in the steam temperature.

According to one class of implementations, the steam temperature data are converted to the frequency domain (e.g., using a Fast Fourier Transform or FFT) to determine the frequency and/or magnitude of any cycles in the temperature data. Such an approach may be desirable in cases where the magnitudes of the frequency components are important. On the other hand, this approach might not be particularly well suited if there is not a high degree of confidence that the sampling rate for the temperature data will be consistent.

According to another class of implementations, an autocorrelation algorithm may be used to determine the overall period of any repeating cycle in the steam temperature data. The use of an autocorrelation algorithm is also particularly well suited to implementations which seek only to determine whether or not cycling is occurring as opposed to determining the constituent frequency components of the cycling.

Figure 6:
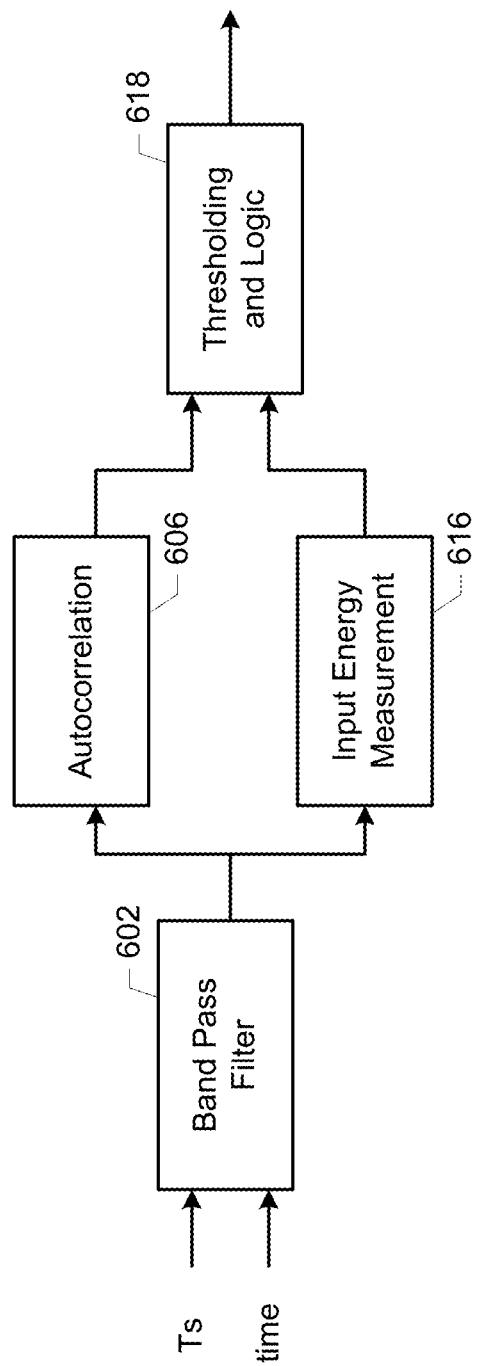
FIG. 6 is another flow diagram illustrating processing of steam trap monitor data as enabled by the present disclosure.

A particular implementation of a modulation detection analysis using an autocorrelation algorithm will now be described with reference to FIG. 6. However, it should be noted that the present disclosure both contemplates and enables implementations in which frequency conversion (e.g., using an FFT) is employed, either as an alternative or in combination with an autocorrelation function.

Regardless of the technique used to detect temperature cycling, the steam temperature data (Ts) are preconditioned prior to analysis; in this specific implementation, using a band pass filter 602. Such preconditioning may be useful, for example, in cases in which the steam temperature data have a large DC offset. Use of a DC blocking filter with a relatively steep roll off prevents overflow of the autocorrelation algorithm (or masking of the low frequency components of the FFT output). Such filtering may also be useful for implementations in which high frequency changes from sample to sample are considered to be noise.

An autocorrelation algorithm (606) is run on the steam temperature data using a regular number of samples. The autocorrelation algorithm may, but is not required to, account for missing samples or variations in sample timing.

A variety of post-processing techniques may be applied to the raw autocorrelation output prior to its interpretation. For example, central peak removal involves "de-mirroring" of the raw autocorrelation output followed by removal of the central peak. For a cyclic signal, the output of an autocorrelation algorithm is mirrored about the central (zero delay) point. This means that half of the output vector can be discarded without incurring any loss of information. In one approach, the first half of the vector is discarded as this results in a vector arranged in order of increasing delay (starting at zero).

As is well known, there will always be a peak at the zero delay point, and it will always be the highest level of the autocorrelation output. This is because at zero delay, there is a 100% correlation of the signal, and no other alignment can result in better than 100% correlation. However, because we are trying to identify a cyclic delay, this peak (which represents zero delay) is irrelevant, so it is advantageous to remove it. The peak can be removed by analyzing the first derivative of the autocorrelation output to isolate the central peak from any adjacent peaks. Since the central peak is guaranteed to be the highest peak, the first derivative to either side of the peak is guaranteed to be negative. Moving along the autocorrelation output, the first derivative will turn positive at the foot of the next peak, however slightly. Thus, simple logical analysis allows us to determine the limits of the central peak. The peak is then removed by setting all values in the central section of the data to be equal to the first value outside that section. If the peak occupies the entire block, the correlation for the entire block is set to zero.

The absolute magnitude of the various peaks in the autocorrelation output may not be particularly important as it is a function of the magnitude of the input signal. And since no amount of delay can produce a higher correlation than the 100% correlation found at the central peak, it may be advantageous to represent all other outputs as relative to the central point. This gives a correlation factor that is irrespective of signal level. Thus, the autocorrelation output may be normalized to the central (zero delay) point. This gives a meaningful representation of how well the signal repeats itself at various delay amount.

In addition to the application of the autocorrelation algorithm (706), a representation of the energy of each block of temperature data is determined (716). If the autocorrelation output has been normalized, it may no longer include sufficient information for determining whether it represents actual cycling of the trap (e.g., several degrees of temperature swing) or only a slight undulation in the temperature readings (e.g., spanning only one or two degrees). Determining the energy level of the original input block can be used to resolve this ambiguity.

The autocorrelation vector and the energy measurement vector are fed through thresholding and qualification logic 718 to qualify them as representative of modulated steam. All threshold outputs are combined using a logical AND statement. In some cases, a simple thresholding of the inputs may be done.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A sensing device, comprising:
   one or more sensors configured to generate sensor signals;
   one or more transmitters configured to transmit sensor data representing the sensor signals;
   control circuitry configured to control operation of the one or more transmitters, and to convert the sensor signals to the sensor data;
   a first energy harvesting input configured to receive first power from a first energy harvesting device configured to harvest a first type of energy from an environment in which the sensing device is deployed;
   a second energy harvesting input configured to receive second power from a second energy harvesting device configured to harvest a second type of energy from the environment, the second type of energy being different from the first type of energy;
   an energy storage device configured to store energy derived from the first and second power; and
   power management circuitry configured to receive the first power and the second power, and to control storing of the stored energy by the energy storage device, the power management circuitry being further configured to provide third power generated from the stored energy to the one or more transmitters and the control circuitry, wherein the power management circuitry is configured to operate in a first mode in which the stored energy is derived only from the first power, in a second mode in which the stored energy is derived only from the second power, and in a third mode in which the stored energy is derived from a combination of the first power and the second power.

2. The sensing device of claim 1, wherein each of the first and second types of energy is one of light energy, mechanical energy, heat energy, vibrational energy, acoustic energy, ultrasonic energy, radio frequency energy, electromagnetic energy, or magnetic energy.

3. The sensing device of claim 1, wherein the power management circuitry includes at least one of a DC-DC converter, an AC-DC converter, a buck converter, a boost converter, a buck-boost converter, or a single inductor multiple output (SIMO) converter.

4. The sensing device of claim 1, wherein the energy storage device is either a capacitor or a battery.

5. The sensing device of claim 1, wherein the sensing device is configured to monitor a steam trap, wherein the one or more sensors include a first temperature sensor and a second temperature sensor, and wherein the sensor data represent steam temperature and condensate temperature.

6. The sensing device of claim 5, wherein the sensor data include first time series data representing the steam temperature and second time series data representing the condensate temperature.

7. The sensing device of claim 1, wherein the first energy harvesting device comprises a thermo-electric generator and the second energy harvesting device comprises one or more photovoltaic cells.

8. The sensing device of claim 1, wherein the second energy harvesting input is configured for connection to the energy storage device.

9. The sensing device of claim 8, wherein the power management circuitry includes converter circuitry, and wherein, when the second energy harvesting input is connected to the energy storage device, the second power raises the stored energy of the energy storage device such that the converter circuitry turns on.

10. The sensing device of claim 1, further comprising selection circuitry configured to selectively enable the power management circuitry to operate in the first, second, or third modes.

11. The sensing device of claim 1, wherein the power management circuitry includes power-point-tracking circuitry configured to track either or both of the first power and the second power.

12. The sensing device of claim 1, wherein the control circuitry is configured to wake up from a low-power mode to take readings of the sensor signals, control operation of the one or more transmitters, and convert the sensor signals to the sensor data.

13. The sensing device of claim 12, further comprising a wakeup timer configured to generate a wakeup message, or a wakeup receiver configured to receive a wakeup message from a remote device.

14. The sensing device of claim 1, wherein the control circuitry is configured to packetize the sensor data for transmission to a remote device, each packet of the sensor data identifying the sensing device and having a timestamp for the associated sensor data.

15. The sensing device of claim 14, wherein the one or more sensors comprise a plurality of sensors, and wherein each packet includes information correlating portions of the associated sensor data with corresponding ones of the plurality of sensors.

16. A steam trap monitor, comprising:
a plurality of temperature sensors configured to generate sensor signals representing a steam temperature and a condensate temperature associated with a steam trap;
one or more transmitters configured to transmit sensor data representing the sensor signals to a remote device;
a wakeup receiver configured to receive a wakeup message from the remote device;
control circuitry configured to control operation of the one or more transmitters, and to convert the sensor signals to the sensor data, the sensor data comprising first time series data representing the steam temperature and second time series data representing the condensate temperature, wherein the control circuitry is further configured to wake up from a low-power mode in response to the wakeup message to take readings of the sensor signals, control operation of the one or more transmitters, and convert the sensor signals to the sensor data
a first energy harvesting input configured to receive first power from a thermo-electric generator;
a second energy harvesting input configured to receive second power from a photovoltaic cell;
an energy storage device configured to store energy derived from the first and second power; and
power management circuitry configured to receive the first power and the second power, and to control storing of the stored energy by the energy storage device, the power management circuitry being further configured to provide third power generated from the stored energy to the one or more transmitters and the control circuitry, wherein the power management circuitry includes power-point-tracking circuitry configured to track either or both of the first power and the second power, and wherein the power management circuitry is configured to operate in a first mode in which the stored energy is derived only from the first power, in a second mode in which the stored energy is derived only from the second power, and in a third mode in which the stored energy is derived from a combination of the first power and the second power.

17. The steam trap monitor of claim 16, wherein the second energy harvesting input is configured for connection to the energy storage device.

18. The steam trap monitor of claim 17, wherein the power management circuitry includes converter circuitry, and wherein, when the second energy harvesting input is connected to the energy storage device, the second power raises the stored energy of the energy storage device such that the converter circuitry turns on.

19. The steam trap monitor of claim 16, wherein the control circuitry is configured to packetize the sensor data for transmission to the remote device, each packet of the sensor data identifying the steam trap monitor and having a timestamp for the associated sensor data.

20. The steam trap monitor of claim 19, wherein each packet includes information correlating portions of the associated sensor data with corresponding ones of the temperature sensors.

* * * * *